US006958166B2

(12) United States Patent
Taylor

(10) Patent No.: US 6,958,166 B2
(45) Date of Patent: Oct. 25, 2005

(54) FRYING APPARATUS WITH CLOSED LOOP COMBUSTION CONTROL AND METHOD

(75) Inventor: Raymond G. Taylor, Shreveport, LA (US)

(73) Assignee: The Frymaster Corporation, Shreveport, LA (US)

(*) Notice: Subject to any disclaimer, the term of this patent is extended or adjusted under 35 U.S.C. 154(b) by 2 days.

(21) Appl. No.: 10/247,129

(22) Filed: Sep. 19, 2002

(65) Prior Publication Data

US 2003/0056660 A1 Mar. 27, 2003

Related U.S. Application Data

(60) Provisional application No. 60/323,895, filed on Sep. 21, 2001.

(51) Int. Cl.[7] .............................. A23L 1/01; A47J 27/00
(52) U.S. Cl. ......................... 426/233; 99/330; 99/331; 99/403; 126/357.1; 126/391.1; 426/438; 426/523; 431/328
(58) Field of Search ................................ 426/231, 233, 426/438, 439, 523; 99/330, 331, 403; 126/357.1, 391.1; 431/1, 328

(56) References Cited

U.S. PATENT DOCUMENTS 5,209,218 A * 5/1993 Daneshvar et al. ........... 99/403
5,398,668 A * 3/1995 Daneshvar et al. ........... 99/403

OTHER PUBLICATIONS

International Search Report dated Aug. 1, 2003.

* cited by examiner

*Primary Examiner*—George C. Yeung
(74) *Attorney, Agent, or Firm*—Ohlandt, Greeley, Ruggiero & Perle, LLP

(57) ABSTRACT

Frying apparatus for frying food, such as French fries, vegetables, bakery goods, meat fish, poultry and the like, in a heated fluid contained in a fry pot. The fluid is heated by a combustion burner that has a heat exchanger removably disposed in the heating fluid. When removed from the fluid, the heat exchanger and the fry pot can be easily cleaned. The air and/or gas is injected into the combustion chamber so as to provide an air gas ratio that supports clean combustion. A control monitors various temperatures and other parameters at various locations of the frying apparatus to control the efficiency of the frying apparatus to approximate a predetermined efficiency by altering the air/gas ratio.

32 Claims, 2 Drawing Sheets

FRYING APPARATUS WITH CLOSED LOOP COMBUSTION CONTROL AND METHOD

This Application claims the benefit of U.S. Provisional Application No. 60/323,895, filed Sep. 21, 2001.

FIELD OF THE INVENTION

This invention relates to a frying apparatus with a removable heat exchanger. The present invention also relates to a frying apparatus and method for controlling the temperature of a cooking fluid thereof.

BACKGROUND OF THE INVENTION

Commercial gas fryers generally have a fry pot for containing a cooking fluid and a means for heating the cooking fluid. One type of fry pot, known as the open pot design, requires heat to be applied to the exterior sides of the fry pot. The open pot design has an advantage of being easily cleaned. Open pot designs use either an atmospheric burner or a forced combustion burner. Open pot designs with an atmospheric burner achieve an efficiency of about 45%, while open pot designs with forced combustion burners achieve an efficiency of about 65 to 70%. The disposition of the burner adjacent the exterior sides of the fry pot has the disadvantage of heating the entire fry pot including the temperature sensitive wiring and controls.

Another type of fry pot, known as the tube design, has heat applied by means of one or more tubes (typically, four for a standard pot) that are disposed in the fry pot below the cooking fluid level. The tube fryer has an efficiency that is about 3 to 5% greater than that of the open pot design with an atmospheric burner. The tube fryer is also difficult to clean due to the tubes that are permanently installed in the fry pot.

There is need for a frying apparatus and method that achieves a high efficiency without an external burner.

There is also a need for a frying apparatus that has a heat exchanger that is removably disposed to facilitate cleaning the fry pot.

SUMMARY OF THE INVENTION

The method of the present invention controls the temperature of a cooking fluid in a frying apparatus in a manner that achieves a high efficiency. An air/gas mixture is supplied to a combustion burner that is disposed to heat the cooking fluid. One or more operating parameters of the frying apparatus are monitored to determine a deviation from a predetermined efficiency. The air and gas are adjusted to compensate for the deviation so as to maintain the operating parameters in a range that approximates the predetermined efficiency.

According to one aspect of the method of the present invention, the gas flow is orificed or modulated and the compensating adjustment is made to the flow of the air to achieve the correct air/gas mixture. According to another aspect of the method, the airflow is acoustically modulated in response to the deviation to optimize the performance of the fryer.

According to a further aspect of the method of the present invention, the operating parameters may include internal temperature of the combustion chamber of the combustion burner, temperature of a flue connected to the combustion chamber, flame current in the combustion chamber, temperature of the cooking fluid, cooking fluid rate of rise, temperature difference between a set point temperature and the instantaneous temperature of the cooking fluid, elapsed cooking time, remaining cooking time, absolute airflow for an optimum burn, or a comparison of current airflow with average flow rate over a predetermined number of previous combustion control cycles.

According to another embodiment of the method of the present invention, a burner that is attached to a fry pot, or optionally a housing, of a frying apparatus is handled by moving the burner between a cooking position within the fry pot and a removed position at least partially outside of the fry pot without detachment from the fry pot or the optional housing. Preferably, the movement is pivotal.

The frying apparatus of the present invention has a fry pot and a combustion burner (combustion chamber/heat exchanger combined) that is disposed to heat cooking fluid contained in the fry pot. By means of a modulated air supply and an orificed or modulated gas supply, an optimum mixture occurs in the combustion burner. One or more sensors sense an operating parameter of the frying apparatus to develop a feedback signal. A control responds to the feed back signal to adjust the air/gas supply for maximum efficiency and clean combustion.

According to one aspect of the frying apparatus of the present invention, the control means acoustically modulates the airflow to the mixer in response to the feed back signal.

According to another embodiment of the present invention, a frying apparatus includes a fry pot and a combustion burner. The combustion burner includes a combustion chamber and a heat exchanger with the combustion occurring below the oil line. The combustion burner is removably disposed in the fry pot below the cooking fluid level. A flue extends from the heat exchanger out of the cooking fluid. The combustion burner is disposed for motion between a cooking position where it is disposed in the cooking fluid and a removed position outside the cooking fluid for ease of cleaning.

According to one aspect of this embodiment, the combustion burner is preferably coupled to the fry pot (or optionally to housing of) the frying apparatus for pivotal motion between the cooking position and the removed position. Additionally, the air and gas are supplied to separate swivel assemblies to facilitate pivoting the combustion burner from the fry pot.

BRIEF DESCRIPTION OF THE DRAWINGS

Other and further objects, advantages and features of the present invention will be understood by reference to the following specification in conjunction with the Figures of the drawing in which like reference characters denote like elements of structure, and.

DESCRIPTION OF THE PREFERRED EMBODIMENT

Figure 1:
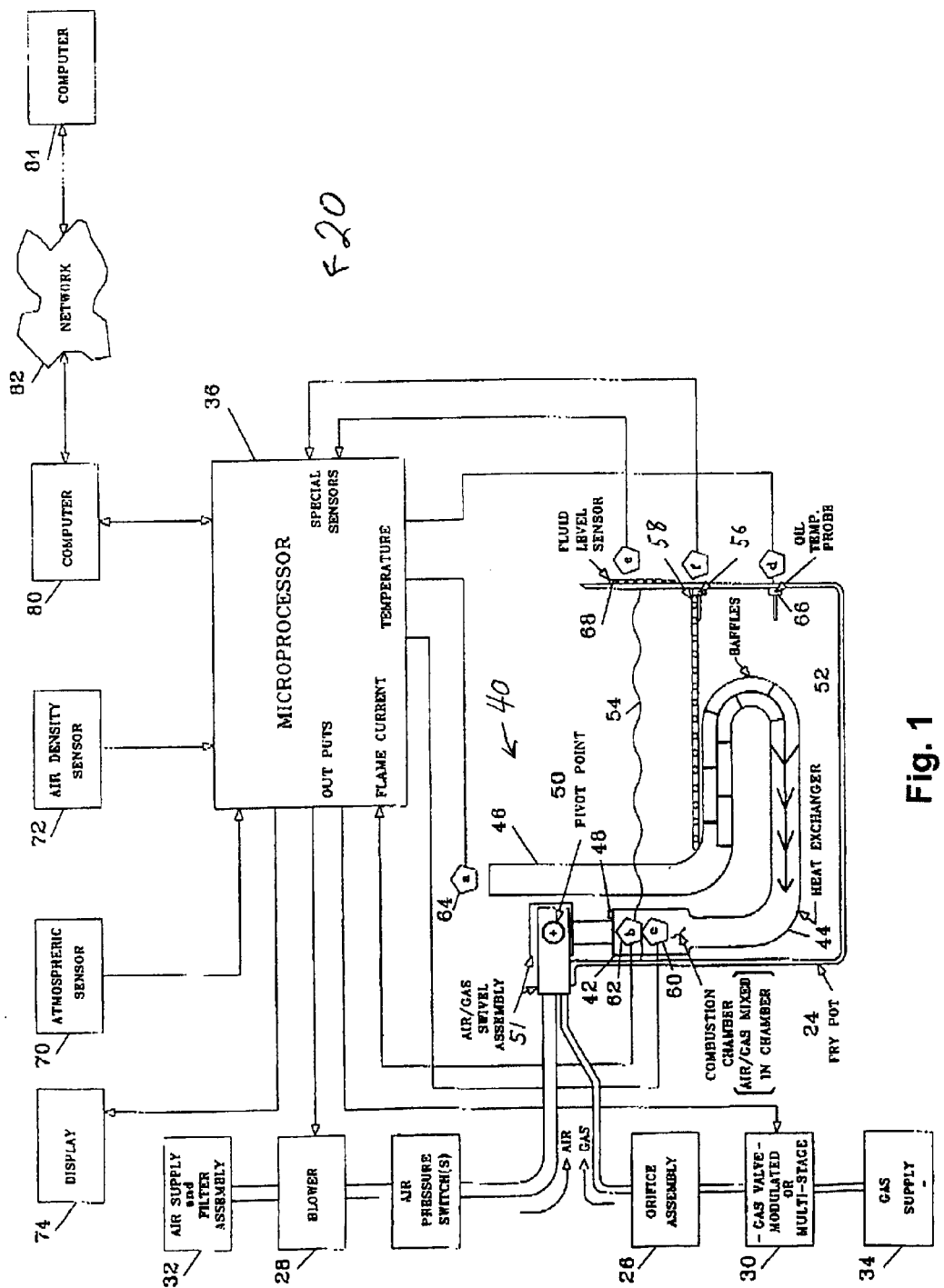
FIG. 1 depicts a frying apparatus of the present invention with the combustion burner in the cooking position.

Referring to the FIG. 1, a frying apparatus 20 includes a fry pot 24, a gas orifice assembly 26, a blower 28, a gas valve 30, a control 36 and a combustion burner 40. Combustion burner 40 includes a combustion chamber 42, a heat exchanger 44, a flue 46 and an igniter 48. Gas orifice assembly 26 is connected to combustion chamber 42 to provide optimum gas flow that is injected therein.

Combustion chamber 42 includes an internal substantially cylindrical titanium liner within which the air/gas mixture is injected. Igniter 48 ignites or initiates combustion in combustion chamber 42. Heat exchanger 44 is connected to combustion chamber 42 so as to convey the combustion gas along its length and flue 46 to atmosphere. Heat exchanger 44 and flue 46 may be formed of one integral piece or of two or more parts that are connected together as a one-piece assembly. Contained within the heat exchanger is a baffle 29 comprised of fins progressively sized/formed to provide uniform heating of heat exchanger 44.

Figure 2:
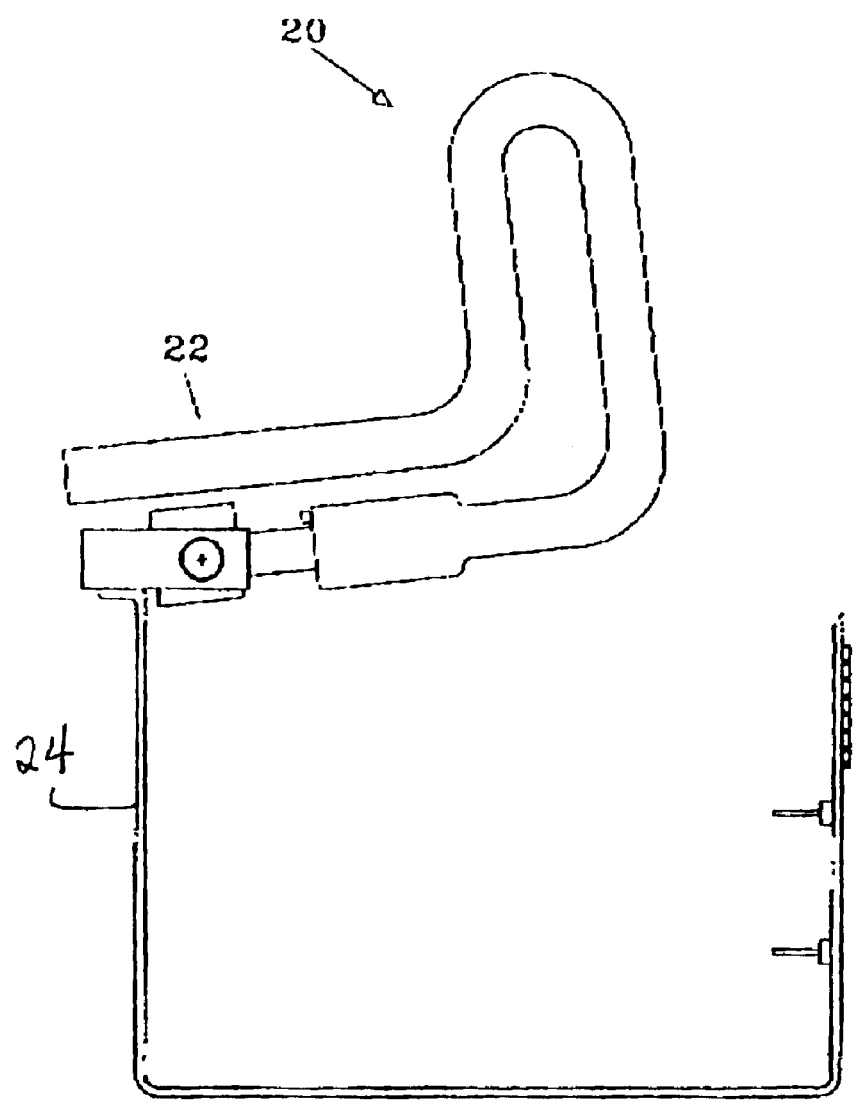
FIG. 2 depicts the frying apparatus of FIG. 1 with the combustion burner in the cleaning position.

Combustion burner 40 is preferably mounted to fry pot 24 at a pivot 50 via an air/gas swivel assembly 51 for pivotal or rotational motion between a cooking position and a removal position. In an alternate embodiment, fry pot 24, combustion burner 40, pivot 50 and air/gas swivel assembly 51 are mounted to an optional housing (not shown). When in the cooking position (as shown in FIG. 1), heat exchanger 44 is disposed in fry pot 24 below a level 54 of a cooking fluid 52. When in the removed position (as shown in FIG. 2), heat exchanger 44 is disposed out of and above fry pot 24 so as to permit ease of cleaning of fry pot 24 and heat exchanger 44. Preferably, air/gas swivel assembly 51 includes separate air and gas swivel assemblies for the conduits, channels or the like that carry the air and the gas. The pivotal motion may be manual or driven by a motor (not shown).

According to another aspect of the present invention, control 36 is operable to adjust the ratio of air/gas that supports clean combustion in combustion burner 40 in response to a deviation from a predetermined efficiency so as to maintain the efficiency at approximately the predetermined efficiency. This adjustment is achieved by altering characteristics of the air or the gas, such as airflow, air pressure, gas energy, gas volume, gas pressure, gas flow, or any combination thereof. The air/gas supply is adjusted by controlling blower 28 and gas valve 30. Blower 28 and gas valve 30 are connected to an air supply/filter assembly 32 and a gas supply 34, respectively. According to one aspect of the invention, blower 28 is controllable by control 36 to modulate the airflow from air supply/filter assembly 32, and thereby control the flow and pressure of air supplied to combustion burner 42. Any suitable controllable blower may be used.

The gas pressure and flow may also be regulated by controlling gas valve 30. Gas valve 30, for example, may be a multi-stage or modulated gas valve. For example, a suitable controllable gas valve may be obtained from Honeywell, Inc.

Control 36 may be any suitable microprocessor that can accept a number of inputs, process the inputs and provide output signals for the control of blower 28 and/or gas valve 30. For example, control 36 may be procured from National Instruments, Inc.

The inputs to control 36 are the outputs of a plurality of sensors that are positioned in various locations of frying apparatus 20 to sense various operating parameters thereof. The plurality of sensors includes a sensor 60 that detects internal temperature of combustion chamber 42, a sensor 62 that senses rectified flame current, a sensor 64 that senses flue temperature, a sensor 66 that senses temperature of cooking fluid 52, a sensor 68 that senses level 54 of cooking fluid 52, an atmospheric pressure sensor 70, and an air density sensor 72. The outputs of the aforementioned sensors are sampled to provide sample values that are used by control 36 to adjust the air/gas ratio to control the combustion efficiency to approximately the predetermined efficiency. A basket rack sensor 56 detects the presence and removal of a cooking basket 58 to provide automatic cook timer start and duration of the basket in the cooking oil. This feature permits automatic logging of the number of baskets cooked, under/over cook times vs. the programmed cook time and filtration of the cooking oil as a function of usage.

Control 36 also derives from the sample values other parameters that include cooking fluid temperature rate of rise, temperature difference between a cooking fluid set point and the instantaneous temperature of the cooking fluid, difference between the current air flow rate and the average flow rate of the last n combustion cycles. For example, n can be any number, but is preferably about 100. Control 36 also uses other parameters to control the combustion efficiency that include elapsed cook time, remaining cook time, relative BTU variations in the gas, fryer construction/component differences (e.g., differences in material, dimensions, tolerance and the like) and absolute airflow rate required for optimum combustion.

The combustion process controlled by control 36 in combustion burner 40 achieves very high efficiency in converting the hydrocarbon energy in the gas to extremely high temperature (on the order of 2,500° F) combustion gases rich in infrared energy. In addition, the present invention achieves a difference between the cooking fluid temperature set point and the flue gas temperature of about 250° F or less.

Control 36 monitors the aforementioned sample values, as well as the voltage supply (not shown), gas supply 34 and air supply/filter assembly 32, at a sample rate of many times (e.g., about 10) per second and compares these values with a domain of values required for normal and safe operation of frying apparatus 20. If any parameter is missing or outside its domain and is correctable by a user, control 36 displays an error message on a display 74 for corrective action by the user. User correctable errors include, e.g., cooking fluid low or not present, gas supply line disconnected, low line voltage, and the like. Display 74 will conspicuously display the error message in a location that visually alerts the user. In addition, an audible signal can also be used.

Display 74 may include a plurality of red, amber and green light emitting diodes (LEDs). A green status LED indicates frying apparatus 20 is ready for use. A green flashing LED indicates frying apparatus 20 is warming up. A red status LED indicates a fryer component failure and that a need for service has been sent to and acknowledged by a service company. An amber status LED indicates frying apparatus 20 is not usable, but the user can take corrective action. The type of corrective action may be displayed by an on site computer 80. If any of the parameters are out of a defined range, control 36 will shut down frying apparatus 20 and indicate the nature of the shut down via display 74 and on site computer 80.

Control 36 also monitors the cooking cycle to assure the food product is neither undercooked nor overcooked. This is accomplished by basket sensor 56 that signals the times the basket 58 of product enters and leaves cooking fluid 52. The difference between the entry and leaving times represents an actual cook time that can be compared with the required cook time. The cook time data can be stored in onsite computer 80 for review by restaurant personnel.

Onsite computer 80 can be linked via a network 82 to a remote computer 84 so that the operating data of frying apparatus 20 can be processed by remote computer 84. For example, remote computer 84 could process the data for maintenance purposes or could process the data for restaurant management purposes. Network 82 can be any suitable wired, wireless or optical network, such as the public telephone network, the Internet, the World Wide Web, or any combination thereof. Onsite computer 80 and remote computer 84 can be equipped with suitable network communication capability, such as a modem, a browser and/or a server capability.

Fluid level sensor 68 is a non-intrusive cooking fluid sensor. Control 36 can monitor the sample values provided by fluid level sensor 68 to determine if the fluid level is low or zero or overfilled, adjust the cook time as needed to provide uniform cooking results, and ascertain when filtering of cooking fluid 52 is done relative to the food products being cooked. The exact level of the cooking oil affects the rate of change in cooking oil temperature down as the food product enters the oil and up when the burner turns on) and, thus the quality of the cook. Control 36 monitors the number of cook cycles per pot and displays the need for filtering an as needed basis.

The present invention having been thus described with particular reference to the preferred forms thereof, it will be obvious that various changes and modifications may be made therein without departing from the spirit and scope of the present invention as defined in the appended claims.

What is claimed is:

1. A method of controlling the temperature of a cooking fluid in a frying apparatus, said method comprising:
   (a) supplying air and gas separately to a combustion chamber for mixture therein so as to provide combustion that has a combustion efficiency;
   (b) monitoring one or more operating parameters of said frying apparatus to determine a deviation of said combustion efficiency from a predetermined efficiency; and
   (c) adjusting at least one of said air and gas in response to said deviation to control said combustion efficiency to, said predetermined efficiency.

2. The method of claim 1, wherein said combustion means comprises a combustion chamber and a heat exchanger, and wherein said heat exchanger is disposed in said cooking fluid.

3. The method of claim 2, wherein said heat exchanger is removably disposed in said cooking fluid.

4. The method of claim 1, wherein step (c) adjusts flow of said air.

5. The method of claim 1, wherein step (c) modulates said flow of air.

6. The method of claim 1, wherein step (c) acoustically modulates said flow of air.

7. The method of claim 1, wherein said one or more operating parameters are selected from the group consisting of: internal temperature of said combustion chamber, temperature of a flue connected to said combustion chamber, flame current in the combustion chamber, temperature of said cooking fluid, cooking fluid rate of rise, temperature difference between a set point temperature and the instantaneous temperature of the cooking fluid, elapsed cooking time, remaining cooking time, absolute airflow for an optimum burn, a comparison of current airflow with average flow rate over a predetermined number of previous combustion control cycles, and any combination thereof.

8. The method of claim 1, wherein step (c) changes a characteristic of said air or said gas that is selected from the group consisting of: airflow, air pressure, gas energy, gas volume, gas pressure, gas flow, or any combination thereof.

9. A method for removing a burner from the fry pot of a frying apparatus, wherein the burner is attached to the fry pot or optionally to a housing, and wherein the burner has separate conduits for air and gas, said method comprising the step of moving said burner from a cooking position within said fry pot to a removed position at least partially outside of said fry pot without detachment from said fry pot or said optional housing and without disconnection of said separate conduits.

10. The method of claim 9, wherein said step of moving pivots said burner between said cooking position and said removed position.

11. A frying apparatus comprising:
   a fry pot for containing a cooking fluid; and
   a heat exchanger that receives combustion gases from a combustion chamber and that is disposed for motion between a cooking position in said cooking fluid to a position at least partially above said fry pot, wherein said combustion chamber is connected to separate conduits for air and gas, and whereby said heat exchanger and/or said fry pot may be cleaned without any disassembly and without disconnection of said conduits.

12. The frying apparatus of claim 11, wherein said motion is pivotal.

13. The frying apparatus of claim 11, wherein said combustion chamber is arranged for pivotal motion with said heat exchanger.

14. The frying apparatus of claim 13, wherein said combustion chamber is pivotally mounted to said fry pot or optionally to a housing.

15. The frying apparatus of claim of claim 12, wherein air and gas conduits supply air and gas to said combustion chamber via separate swivel assemblies.

16. The frying apparatus of claim 11, wherein said combustion chamber and said heat exchanger are comprised of a one piece weldless and seamless pipe.

17. The frying apparatus of claim 16, wherein said pipe extends at least partially below a cooking fluid level, when said heat exchanger is in said cooking position.

18. The frying apparatus of claim 11, wherein said combustion chamber has a titanium liner.

19. A frying apparatus comprising:
   a fry pot and a combustion chamber;
   means for providing air and gas separately to said combustion chamber for mixture therein so as to provide combustion that has a combustion efficiency; and
   means for changing a characteristic of at least one of said air and said gas to alter said combustion efficiency.

20. The frying apparatus of claim 19, further comprising a heat exchanger that receives combustion gases from said combustion chamber.

21. The frying apparatus of claim 20, further comprising control means for controlling said changing means in response to at least one parameter selected from the group consisting of: internal temperature of said combustion chamber, temperature of a flue connected to said heat exchanger, flame current in the combustion chamber, temperature of cooking fluid contained in said fry pot, cooking fluid rate of rise, temperature difference between a set point temperature and the instantaneous temperature of the cooking fluid, elapsed cooking time, remaining cooking time, absolute airflow for an optimum burn, a comparison of current airflow with average flow rate over a predetermined number of previous combustion control cycles, and any combination thereof.

22. The frying apparatus of claim 19, further comprising:
   a heat exchanger for receiving combustion gases from said combustion chamber to heat a cooking fluid in said fry pot;

means for sensing at least one parameter of said fry pot, said combustion chamber, said heat exchanger or said cooking fluid to provide a feedback signal; and control means responsive to said feedback signal to cause said means for changing to change said characteristic, thereby altering said combustion efficiency.

23. The frying apparatus of claim 22, further comprising means for sensing an ambient condition to provide an ambient condition signal, and wherein said control means is responsive to said ambient condition signal to cause said means for changing to change said characteristic.

24. The frying apparatus of claim 23, wherein said ambient condition is selected from the group consisting of barometric pressure, air density and temperature.

25. The frying apparatus of claim 22, wherein said characteristic is selected from the group consisting of: airflow, air pressure, gas energy, gas volume, gas pressure, gas flow, or any combination thereof.

26. The frying apparatus of claim 19, wherein said means for changing modulates a characteristic of the group consisting of: said air, said gas and a combination thereof.

27. The frying apparatus of claim 19, wherein said means for changing comprises a multi-state valve that modulates said gas.

28. A frying apparatus comprising:

a fry pot and a combustion means for heating a cooking fluid contained in said fry pot for the cooking of food;

one or more sensors arranged to provide samples of operator correctable parameters;

means for determining if the samples of one or more of said parameters deviate from predetermined normal operating values, thereby defining one or more operator correctable faults; and means for displaying an indication of said one or more faults to said operator.

29. The frying apparatus of claim 28, wherein said one or more parameters are selected from the group consisting of: supply voltage, gas supply, temperatures, cooking fluid level, combustion flame current and air supply.

30. A frying apparatus comprising:

a fry pot and a combustion means for heating a cooking fluid contained in said fry pot for the cooking of food;

first and second conduits that are connected to said combustion means and that supply air and gas, respectively, to said combustion means:

means for obtaining samples of temperature of combustion in said combustion means; and means responsive to said samples for altering at least one said gas and air so as to provide combustion that has a combustion efficiency that approximates predetermined efficiency.

31. The frying apparatus of claim 30, wherein said means for obtaining also obtains samples of parameters selected from the group consisting of: temperature of a flue connected to said heat exchanger, flame current in the combustion chamber, temperature of cooking fluid contained in said fry pot, cooking fluid rate of rise, temperature difference between a set point temperature and the instantaneous temperature of the cooking fluid, elapsed cooking time, remaining cooking time, absolute airflow for an optimum burn, a comparison of current airflow with average flow rate over a predetermined number of previous combustion control cycles, and any combination thereof.

32. The frying apparatus of claim 30, wherein said combustion means further includes a combustion chamber, a heat exchanger and a flue, and wherein said temperature samples are taken from said combustion chamber, said heat exchanger and/or said flue.

* * * * *